(12) United States Patent
Brizius et al.

(10) Patent No.: US 9,422,406 B2
(45) Date of Patent: Aug. 23, 2016

(54) TAILORABLE LIGNOSULFONATE CARBONATE ADHESIVES

(71) Applicant: EMPIRE TECHNOLOGY DEVELOPMENT LLC, Wilmington, DE (US)

(72) Inventors: Glen Leon Brizius, Augusta (GA); Phillip Kent Montgomery, Arden, NC (US)

(73) Assignee: Empire Technology Development LLC, Wilmington, DE (US)

( * ) Notice: Subject to any disclaimer, the term of this patent is extended or adjusted under 35 U.S.C. 154(b) by 16 days.

(21) Appl. No.: 14/491,717

(22) Filed: Sep. 19, 2014

(65) Prior Publication Data

US 2015/0011737 A1    Jan. 8, 2015

Related U.S. Application Data (63) Continuation of application No. 13/811,733, filed as application No. PCT/US2012/043490 on Jun. 21, 2012, now Pat. No. 8,864,892.

(51) Int. Cl.
| | |
|---|---|
| C08H 7/00 | (2011.01) |
| C07G 1/00 | (2011.01) |
| C08L 97/00 | (2006.01) |
| C09J 197/00 | (2006.01) |

(52) U.S. Cl.
CPC .. C08H 6/00 (2013.01); C07G 1/00 (2013.01); C08L 97/00 (2013.01); C09J 197/005 (2013.01); Y02P 20/582 (2015.11)

(58) Field of Classification Search
CPC ........................................................ C08H 6/00
See application file for complete search history.

(56) References Cited

U.S. PATENT DOCUMENTS

| | | | |
|---|---|---|---|
| 3,795,665 A | 3/1974 | Ludwig et al. | |
| 3,850,799 A | 11/1974 | Ludwig | |
| 3,912,706 A | 10/1975 | Rachor et al. | |
| 4,017,475 A * | 4/1977 | Ludwig ................. | C08H 6/00 516/59 |
| 4,051,115 A | 9/1977 | Blount | |
| 4,215,212 A | 7/1980 | Franks | |
| 4,244,728 A | 1/1981 | DelliColli et al. | |
| 4,252,194 A * | 2/1981 | Felber .................. | E21B 43/24 166/272.1 |
| 4,279,788 A | 7/1981 | Lambuth | |
| 4,303,562 A | 12/1981 | Hollis, Jr. et al. | |
| 4,428,429 A | 1/1984 | Felber et al. | |
| 4,486,557 A | 12/1984 | Gaul et al. | |
| 4,548,721 A * | 10/1985 | DeBons ................ | C09K 8/584 166/270.2 |
| 4,562,236 A * | 12/1985 | Lin ....................... | C08H 6/00 527/400 |
| 4,608,111 A | 8/1986 | Hume, III et al. | |

(Continued)

FOREIGN PATENT DOCUMENTS

DE    19648724 A1 *    5/1998    ............... C07G 1/00

OTHER PUBLICATIONS

Machine translation of DE 19648724 A1, 2015.*

(Continued)

*Primary Examiner* — Liam J Heincer
(74) *Attorney, Agent, or Firm* — Pepper Hamilton LLP (57) ABSTRACT

A two component adhesive system is described. The first component of the system is made from a sulfonated lignin having at least one amine group containing side arm and at least one hydroxyl group containing side arm. The second component of the system is made from a sulfonated lignin having at least one chloroformate group containing side arm.

7 Claims, 3 Drawing Sheets

(56) References Cited

U.S. PATENT DOCUMENTS

| | | | | |
|---|---|---|---|---|
| 4,642,336 A * | 2/1987 | Dilling | ............... | C08H 6/00 527/400 |
| 4,735,616 A | 4/1988 | Eibl et al. | | |
| 4,786,720 A * | 11/1988 | Schilling | ............... | C08H 6/00 530/220 |
| 4,790,382 A | 12/1988 | Morrow et al. | | |
| 4,821,803 A * | 4/1989 | Debons | ............... | C09K 8/58 166/270.1 |
| 4,891,070 A * | 1/1990 | Dilling | ............... | C08H 6/00 106/123.11 |
| 5,037,931 A * | 8/1991 | Meister | ............... | B01D 71/78 527/400 |
| 5,066,790 A | 11/1991 | Glasser et al. | | |
| 5,102,991 A | 4/1992 | Glasser et al. | | |
| 5,102,992 A * | 4/1992 | Glasser | ............... | C08H 6/00 527/400 |
| 5,188,665 A * | 2/1993 | Schilling | ............... | C09D 11/02 106/123.13 |
| 5,230,814 A * | 7/1993 | Naae | ............... | C09K 8/584 166/270.1 |
| 5,260,405 A | 11/1993 | Gardziella et al. | | |
| 5,410,016 A | 4/1995 | Hubbell et al. | | |
| 5,760,149 A | 6/1998 | Sanchez et al. | | |
| 5,833,883 A | 11/1998 | Afzali-Ardakani et al. | | |
| 5,972,047 A * | 10/1999 | Dilling | ............... | C09B 67/0086 8/552 |
| 6,054,562 A | 4/2000 | Kurple | | |
| 6,281,350 B1 * | 8/2001 | Owens | ............... | C08G 73/02 536/123.1 |
| 6,291,557 B1 | 9/2001 | Yamamoto et al. | | |
| 6,458,889 B1 | 10/2002 | Trollsas et al. | | |
| 6,566,406 B1 | 5/2003 | Pathak et al. | | |
| 6,602,952 B1 | 8/2003 | Bentley et al. | | |
| 6,747,076 B2 | 6/2004 | Schneider et al. | | |
| 6,818,018 B1 | 11/2004 | Sawhney | | |
| 7,081,159 B2 | 7/2006 | Thames et al. | | |
| 7,176,256 B2 | 2/2007 | Rhee et al. | | |
| 8,377,853 B2 | 2/2013 | Ballard | | |
| 8,864,892 B2 * | 10/2014 | Brizius | ............... | C09J 197/005 106/123.11 |
| 2002/0174491 A1 * | 11/2002 | Fischer | ............... | D21H 21/143 8/115.51 |
| 2003/0157268 A1 | 8/2003 | Gutowski et al. | | |
| 2004/0158033 A1 * | 8/2004 | Benson | ............... | C08H 6/00 530/200 |
| 2007/0021555 A1 | 1/2007 | Konradi et al. | | |
| 2007/0260046 A1 * | 11/2007 | Tomita | ............... | B01F 17/0028 530/500 |
| 2007/0287640 A1 * | 12/2007 | Ballard | ............... | C09K 8/32 507/219 |
| 2008/0247984 A1 | 10/2008 | Messersmith et al. | | |
| 2009/0264538 A1 | 10/2009 | Hubbell et al. | | |
| 2010/0204368 A1 * | 8/2010 | Benko | ............... | B60C 1/00 524/73 |
| 2010/0258033 A1 | 10/2010 | Yang et al. | | |
| 2011/0064918 A1 | 3/2011 | Andriessen et al. | | |
| 2011/0098384 A1 | 4/2011 | Blount | | |
| 2011/0189291 A1 | 8/2011 | Yang et al. | | |
| 2012/0012035 A1 * | 1/2012 | Blank | ............... | C04B 21/18 106/802 |
| 2012/0156164 A1 | 6/2012 | Park et al. | | |
| 2012/0174831 A1 * | 7/2012 | Hurley | ............... | C04B 28/02 106/808 |
| 2013/0116383 A1 | 5/2013 | Naskar et al. | | |
| 2013/0180927 A1 | 7/2013 | Dong et al. | | |
| 2013/0202905 A1 * | 8/2013 | Blount | ............... | C08H 8/00 428/533 |
| 2013/0233037 A1 * | 9/2013 | Adam | ............... | C05G 3/06 71/23 |
| 2013/0236630 A1 | 9/2013 | Brizius | | |
| 2013/0237695 A1 * | 9/2013 | Adam | ............... | C07G 1/00 530/502 |
| 2013/0248111 A1 | 9/2013 | Brizius | | |

OTHER PUBLICATIONS

Recent Advances in Mitsunobu Reaction, Atlanchim Pharma Sarl, 2006.*
International Search Report and Written Opinion for PCT/US2012/043490 dated Oct. 26, 2012.
Adhesives & "Green", Seeing the forest through the trees, http://www.cpadhesives.com/green-adhesives (printed from Internet Jan. 15, 2012).
Antoni et al., A chemoselective approach for the accelerated synthesis of well-defined dendritic architectures, *Chemical Communications* (May 14, 2007), 22:2249-2251 (Abstract).
Bharat Book Bureau, http://www.bharatbook.com (Printed from Internet Dec. 4, 2012).
Biofuels Basics: Learning about renewable energy, http://www.nrel.gov/learning/re_biofuels.html (Printed from Internet Jul. 27, 2012).
Black, Low-Emitting Green Adhesives Bring Improvement to Indoor Air Quality, *Adhesives & Sealants Industry* (May 1, 2009), pp. 1-4.
FEICA, Association of European Adhesives and Sealants Manufacturers, http://www.feica.com, (Printed from Internet Dec. 4, 2012).
Haars et al., Room-Temperature Curing Adhesives Based on Lignin and Phenoloxidases, *ACS Symposium Series* (Dec. 31, 1989), 385(10):126-134 (Abstract).
Holladay et al., Top Value-Added Chemicals from Biomass, vol. II—Results of Screening for Potential Candidates from Biorefinery Lignin, Pacific Northwest National Laboratory, Prepared for the U.S. Department of Energy (Oct. 2007).
Kraft Process, http://en.wikipedia.org/wiki/Kraft_process, (Printed from Internet Dec. 5, 2012).
Laser Focus World: Multimodal Nonlinear Optical Imaging, http://www.laserfocusworld.com/whitepapers/2012/01/semrockinc.html, (Printed from Internet Jan. 19, 2012).
Lei et al., Environmentally friendly mixed tannin/lignin wood resins, *Journal of Applied Polymer Science* (Sep. 12, 2007), 107(1):203-209 (Abstract).
Lignin Structure, http://en.wikipedia.org/wiki/File:Lignin_structure.svg, (Printed from Internet Dec. 4, 2012).
Mizuno et al., Non-phosgene synthesis of benzyl chloroformate (CbzCl), *Tetrahedron Letters* (2002), 43:7765-7767.
Oil-Price.net: The No. 1 Oil Price Source, http://www.oil-price.net, (Printed from Internet Apr. 30, 2012).
Sarkar et al., Lignin-modified phenolic resin: synthesis optimization, adhesive strength, and thermal stability, *Journal of Adhesion Science and Technology* (Apr. 2, 2012), 14(9):1179-1193 (Abstract).
Soy Inks and Adhesives: Cost Savings and Environmental Assurance, http://soynewuses.org/printing-inks-adhesives, (Printed from Internet Dec. 4, 2012).
Understanding the Kraft Process in Paper Production, http://www.paperindustry.com/kraft-process.asp, (Printed from Internet Dec. 5, 2012).
Urbina, Banned Trailers Return for Latest Gulf Disaster, The New York Times (Jun. 30, 2010).
Volatile Organic Compounds (VOCs): An introduction to Indoor Air Quality (IAQ), http://www.epa.gov/iaq/voc.html, (Printed from Internet Apr. 30, 2012).

* cited by examiner

TAILORABLE LIGNOSULFONATE CARBONATE ADHESIVES

CROSS-REFERENCE TO RELATED APPLICATIONS

The present application is a continuation under 35 U.S.C. §120 of U.S. patent application Ser. No. 13/811,733, filed Jan. 23, 2013 entitled "Tailorable Lignosulfonate Carbonate Adhesives," now U.S. Pat. No. 8,864,892, which in turn claims the benefit of and priority to U.S. national stage filing under 35 U.S.C. §371 of International Application No. PCT/US2012/043490, filed Jun. 21, 2012 and entitled "Tailorable Lignosulfonate Carbonate Adhesives," the disclosure of which is incorporated by reference in its entirety and for all purposes.

BACKGROUND

Adhesives are commonly used in the manufacture of many consumer and commercial products. Adhesives work either by making a bonding layer between two surfaces or by filling in imperfections in the materials and enabling surface adhesion.

Most commonly used adhesives are of petroleum-derived feedstock molecules such as formaldehyde, phenol and methylene diisocyanate. Such chemicals are toxic to humans and animals, and are volatile. Furthermore, petroleum-based adhesives often require solvents such as methylene chloride, toluene and trichloroethane. As the adhesives set, the evaporated solvents contribute to indoor air pollution and also pollute the water supply. Furthermore, as petroleum resources grow scarce, the cost of such adhesives keeps rising. As such, there remains a need for non-toxic, non-flammable adhesives which are derived from natural/renewable sources.

SUMMARY OF INVENTION

In an embodiment, an adhesive system may include a first component made from a first sulfonated lignin having at least one amine group containing side arm, and at least one hydroxyl group containing side arm; and a second component made from a second sulfonated lignin having at least one chloroformate group containing side arm. The first component and the second component are not mixed together.

In an embodiment, a method of adhering a first surface to a second surface may include mixing a first component and a second component of an adhesive system, contacting the first surface, the second surface, or both the surfaces with the mixture of the first and second components, and contacting the first surface to the second surface. The first component may include a first sulfonated lignin having at least one amine group containing side arm, and at least one hydroxyl group containing side arm. The second component may include a second sulfonated lignin having at least one chloroformate group containing side arm.

In an embodiment, a method of adhering a first surface to a second surface may include contacting the first surface with a first component of an adhesive system, contacting the second surface with the second component of the adhesive system, and contacting the first surface to the second surface. The first component may include a first sulfonated lignin having at least one amine group containing side arm, and at least one hydroxyl group containing side arm. The second component may include to second sulfonated lignin having at least one chloroformate group containing side arm.

In an embodiment, a composition may include a sulfonated lignin having at least one amine group containing side arm, and at least one hydroxyl group containing side arm.

In an embodiment, a method of making a composition made from a sulfonated lignin having at least one amine group containing side arm, and at least one hydroxyl group containing side arm may include contacting the sulfonated lignin with a first compound having an amine group and a second compound having a hydroxyl group under conditions that allow for coupling of the first compound and the second compound to the sulfonated lignin.

In an embodiment, a composition may include a sulfonated lignin having a side arm having a chloroformate group.

In an embodiment, a method of making a composition made from a sulfonated lignin having a side arm having a chloroformate group may include contacting the sulfonated lignin with a compound having a terminal chloroformate group under conditions that allow for coupling of the sulfonated lignin with the compound.

In an embodiment, an adhesive may include a first component made from a first sulfonated lignin having at least one amine group containing side arm, and at least one hydroxyl group containing side arm, and a second component made from a second sulfonated lignin having at least one chloroformate group containing side arm. The adhesive is obtained upon mixing the first component and the second component.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In the present disclosure, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
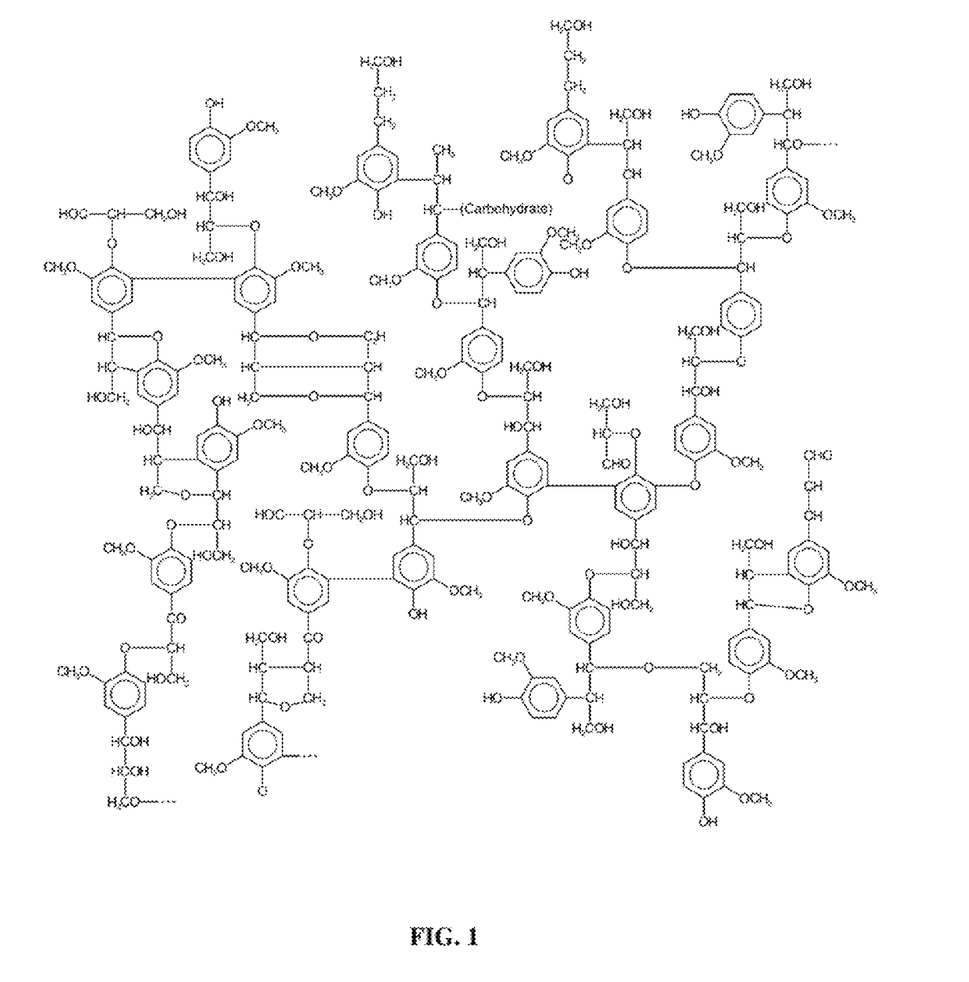
FIG. 1 depicts the generic structure of lignin.

Lignin is a biopolymer most commonly derived from wood. Lignin forms an integral part of the secondary cell walls of plants and some algae, and constitutes between $\frac{1}{4}^{th}$ and $\frac{1}{3}^{rd}$ of dry mass of wood. It is characterized by its unusual heterogeneity and lack of a defined primary structure, as can be seen in FIG. 1. It is the second most abundant organic polymer on the earth with an estimated global production of around 1.1 million tons per year.

One of the most common raw materials for manufacturing paper is wood pulp. Depending on the type of paper, may be desirable in some applications, to remove lignin which may cause yellowing of the paper with age from wood pulp. This may be achieved by sulfite-processing on wood pulp resulting in separation of cellulose fibers from the pulp, leaving behind sulfonated lignin. Sulfonated lignin may be used in various applications such as, but not limited to, fuel, dispersant in cement formulations, water treatment formulations, textile dyes, agricultural chemicals, raw material for various chemicals, leather tanning agents, producing injection moldable plastic substitute, and so forth. Sulfonated lignin may also be used in manufacturing of adhesives.

Figure 2:
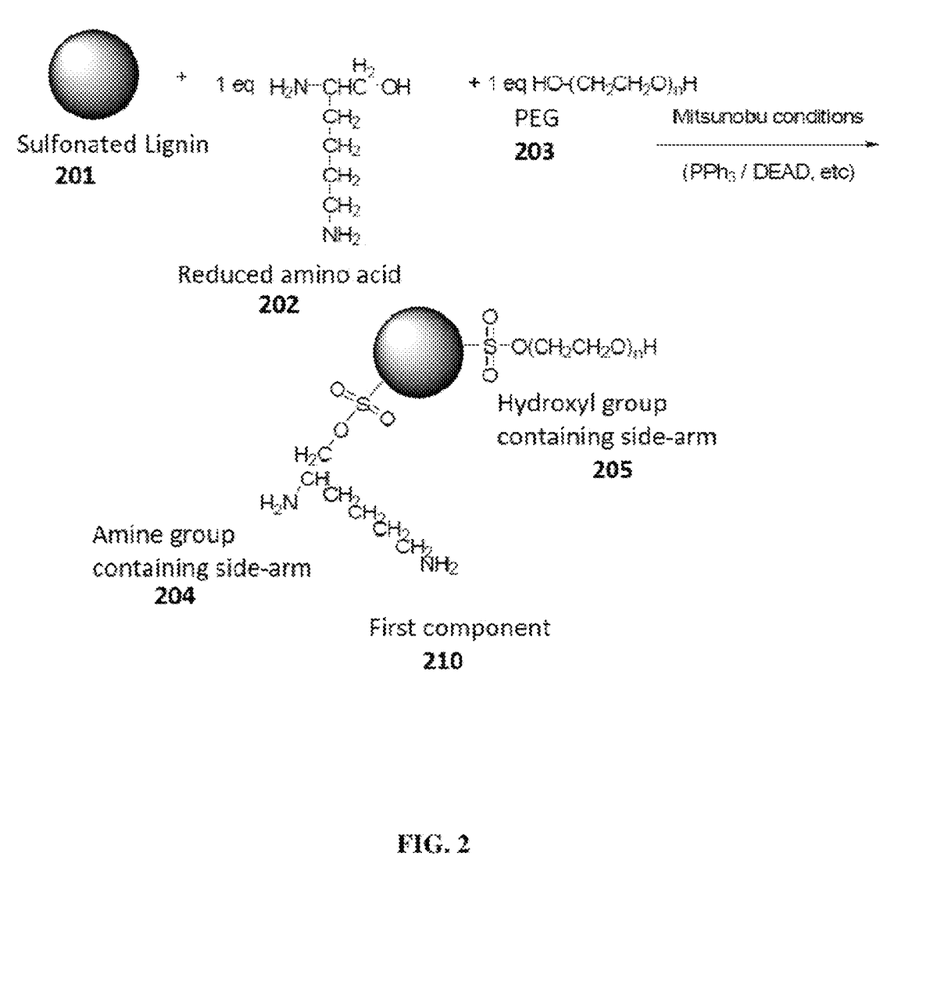
FIG. 2 shows an exemplary chemical reaction for making the first component according to one embodiment.

In some aspects, a composition with sulfonated lignin having at least one side arm containing an amine group and at least one side arm containing a hydroxyl group is described. FIG. 2 shows an exemplary chemical reaction for making a composition 210 according to one embodiment. In some embodiments, each sulfonated lignin 201 may have multiple sulfonate groups. Examples of number of sulfonate groups on each sulfonated lignin 201 include, but are not limited to, 2, 5, 10, 15, 20, 25, 50, 75, 100, 250, 500, 750, 1000, 2500, 5000, 7500, 10000, 12500, 15000, 17500, 20000, 50000, 100000, or any number between (and including the particular endpoints thereof) any two of these numbers. The side arms are attached to the sulfonated lignin 201 at the sulfonate groups. The larger the number of sulfonate groups on the lignin, the more side arms may be attached to it. One skilled in the art will appreciate that steric hindrance may play a role in the kinetics of the reactions by which the sulfonate groups may be substituted by the side arm containing compounds. A skilled artisan will, therefore, be able to choose an optimal level of sulfonation of lignin required to obtain a suitably substituted composition.

In some embodiments, the amine group containing side arm 204 may be obtained from, for example, an amino alcohol or a reduced amino acid 202. In some embodiments, the amino alcohol or the reduced amino acid 202 may be derived from, for example, lysine, aspartic acid, glutamic acid, arginine, histidine, serine, threonine, asparagine, glutamine, cysteine, selenocysteine, glycine, proline, alanine, valine, leucine, isoleucine, methionine, tyrosine, taurine, tryptophan, phenylalanine, pyrrolysine, ornithine, lanthionine, dehydroalanine, L-dihydroxyphenylalanine, 2-aminoisobutyric acid, citrulline, gamma-aminobutyric acid, s-adenosylmethionine, 5-hydroxytryptophan, eflornithine, and/or the like. A skilled artisan will appreciate that the side groups present on the amino acid may change the physical and chemical properties of the resulting compound after the side arm is attached to the lignin. One skilled in the art will be able to make the choice of appropriate amine group containing side arm 204 based on the properties of the composition desired. For example, larger amino acids may result in steric hindrance, thereby reducing the possible number of amine groups that may substitute for sulfonate groups. In some embodiments, the ratio of number of amine groups to number of sulfonate groups may be, for example, 1:2, 1:5, 1:10, 1:50, 1:100, 1:200, 1:300, 1:400, 1:500, 1:600, 1:700, 1:800, 1:900, 1:1000, or any ratio between (and including the particular endpoints thereof) any two of these ratios.

In some embodiments, the hydroxyl group containing side arm 205 may be obtained from, for example, a poly(ethylene glycol) (PEG). In some embodiments, the PEG 203 may have a chain length of about 2 to about 24. Examples of chain lengths include, but are not limited to, 2, 5, 7, 11, 13, 17, 22, 24, or any number between (and including the particular endpoints thereof) any two of these values. A skilled artisan will appreciate that shorter PEG chain length will provide less steric hindrance resulting in a higher coverage of the PEG 203 on the lignin core 201. It will be understood by a skilled artisan that in embodiments where the composition described herein is used for making adhesives, shorter PEG chain length will result a stronger adhesives because there will be more hydroxyl groups 205 available for covalent conjugation per lignin core 201. Similarly, it will be understood that longer PEG chain lengths result in lesser coverage on the lignin core 201, thereby reducing the strength of the adhesive. One skilled in the art will, therefore, be able to optimize the PEG chain length based on the desired application and the strength of resulting adhesive required. In some embodiments, each sulfonated lignin may have multiple hydroxyl group containing side arms 205 such as, for example, 1, 2, 5, 10, 15, 20, 25, 50, 75, 100, 250, 500, 750, 1000, 2500, 5000, 7500, 10000, 12500, 15000, 17500, 20000, 50000, 100000, or any number between (and including the particular endpoints thereof) any two of these numbers.

In some embodiments, the composition 210 may additionally include at least one preservative. In some embodiments, the preservatives may be, for example, sodium benzoate, potassium benzoate, potassium sorbate, phytic acid, methylparaben, ethylparaben, propylparaben, butylparaben, ethoxyquin, dehydroacetic acid, benzoic acid, propionic acid, sodium propionate, calcium dipropionate, 5-chloro-2-methyl-4-isothiazolin-3-one, 2-methyl-4-isothiazolin-3-one, fumaric acid, dimethyl fumarate, trichloroisocyanuric acid, sodium diacetate, dodecene dicyclohexylamine, benzotriazole, copper quinolate, glycolic acid, sodium pentachlorophenolate, sodium nitrite, sodium bisulfite, sodium sulfite, cresol, p-cumylphenol, potassium benzoate, 2,2-dibromo-2-cyanoacetamide, potassium permanganate, propionic acid potassium salt, dequalinium chloride, 1,2-propanediol, 1,4-dichlorobenzene, 2-oxetanone, dichlofluanid, dichlorophen, quintozene, dimethyl fumarate, salicylic acid, sodium acetate, ethoxyquin, 2-phenoxyethanol, ethylene oxide, sodium chlorite, folpet, sodium hypochlorite, formic acid, sodium lauroylsarcosinate, phthalide fuberidazole, sodium mercaptobenzothiazole, 2-mercaptobenzothiazole, sodium perborate, furazolidone, sodium percarbonate, pentanedial, sodium salicylate, sulfadimethoxine, glycin, sulfamethazine, glyoxal, sulfamerazine, sulfamethoxazole, guaiacol, sulfameter, sulfamonomethoxine, sulfisoxazole gantrisin, bromol, hexachlorophene, 2-(thiocyanatomethylthio)benzothiazole, trichlorophenol, hydrogen peroxide, dibromodicyanobutane, thiabendazole, ambam, trisodium 4-carboxy-5-mercapto-3-hydroxy-isothiazole, anilazine, thiophanate-methyl, benomyl, tribromsalan, mancozeb, triclosan, maneb, mebenil, methan-sodium, quinaldine, zinc ethylenebisdithiocarbamate, captafol, zinc bis dimethyldithiocarbamate, carbendazim, carboxin, disodium ethylene-1,2-bisdithiocarbamate, chloramphenicol, chlortetracycline, cetrimonium pentachlorophenoxide, dihydrostreptomycin, lisozima, oxytetracycline, colistin sulfate, tetracycline, thiamphenicol, 5-chloro-2-methyl-4-isothiazolin-3-one, pentachlorophenol, chlorothalonil, pentachlorophenol copper, clotrimazole, isothiazolinones, dimethyloldimethyl hydantoin, 5-chloro-2-methyl-4-isothiazolin-3-one, and 2-methyl-4-isothiazolin-3-one hydrochloride and/or the like. The amount of preservative that may be added to the composition may vary depending on the desired application of the composition. In some embodiments, the amount (by weight) of preservative may be, for example, 0.05%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, or any amount between (and including the particular endpoints thereof) any two of these amounts. It will be understood that the preservative may result in varying degree of effect on the chemical properties of the composition depending on the amount of preservative present. Similarly, a skilled artisan will appreciate that the solubility of the preservative will be dependent on the choice of preservative as well as the particular composition, for example, depending on the PEG chain length, the specific amino acid side-groups present, and so forth. One skilled in the art will be able to optimize the amount of preservative without compromising the desired chemical properties of the composition.

In some aspects, a method of making a composition with sulfonated lignin having at least one side arm containing an amine group and at least one side arm containing a hydroxyl group is described. FIG. 2 shows an exemplary chemical reaction for making a composition 210 according to one embodiment. In some embodiments, the method may include contacting the sulfonated lignin 201 with a first compound having an amine group 202 and a second compound having a hydroxyl group 203 under conditions that allow for coupling of the first compound and the second compound with the sulfonated lignin. Various embodiments of the sulfonated lignin 201, the compound having an amine group 202, and the compound having a hydroxyl group 203 are described herein.

In some embodiments, the sulfonated lignin 201, the compound having an amine group 202, and the compound having a hydroxyl group 203 are contacted under Mitsunobu conditions. Mitsunobu conditions refer to the conditions used during a Mitsunobu reaction which generally refers to an organic reaction that may be used for converting alcohols into other functional groups such as, for example, esters, sulfonate esters, and/or the like. In some embodiments, the reagents used for Mitsunobu conditions may be, for example, triphenyl phosphine ($PPh_3$) and an azodicarboxylate. Examples of azodicarboxylate include, but are not limited to, diethyl azodicarboxylate, diisopropyl azodicarboxylate, di-t-butyl azodicarboxylate, 1,1'-(azocarbonyl)dipiperidine, dibenzyl azodicarboxylate, and/or the like. In some embodiments, the reagents for Mitsunobu conditions may be selected such that the reagents may be recycled or recovered after the reaction is complete. In some embodiments, one or more of dicyclohexylphenylphosphine, diethylphenylphosphine, tributylphosphine, diphenyl-2-pyridylphosphine, 4-(dimethylamino)phenyldiphenylphosphine, isopropyldiphenylphosphine, tri-tert-butylphosphine, tri-n-octylphosphine, tricyclohexylphosphine, polystyryldiphenylphosphine and/or the like may be used instead of triphenyl phosphine. In some embodiments, the triphenyl phosphine, or an equivalent thereof and/or the azodicarboxylate may be anchored to a resin such as, for example, a polystyrene resin. In some embodiments, cyanomethylenetri-n-butylphosphorane may be used as a reagent for Mitsunobu conditions. It will be understood that the temperature conditions and time required to complete the reaction will depend on the choice of reagents, the compound having an amine group 202, the compound having a hydroxyl group 203, the level of sulfonation of the sulfonated lignin 201, and so forth. A skilled artisan will appreciate that factors such as the $pK_a$ of the amine containing compound 202, and the length of the hydroxyl containing compound 203 may additionally influence the rate of reaction under Mitsunobu conditions and will be able to optimize the reaction conditions accordingly.

Figure 3:
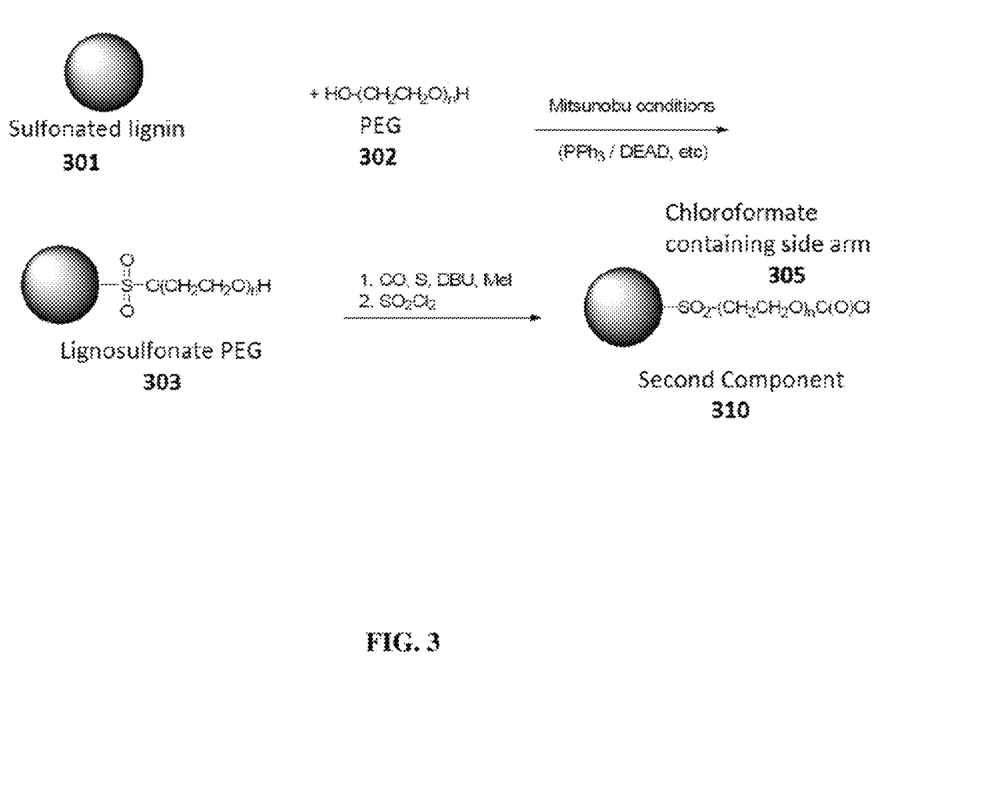
FIG. 3 shows an exemplary chemical reaction for making the second component according to one embodiment.

In some aspects, a composition with a sulfonated lignin having at least one chloroformate group containing side arm is described. FIG. 3 shows an exemplary chemical reaction for making the composition 310 according to one embodiment. In some embodiments, each sulfonated lignin 301 may have multiple sulfonate groups. Examples of number of sulfonate groups on each sulfonated lignin 301 include, but are not limited to, 2, 5, 10, 15, 20, 25, 50, 75, 100, 250, 500, 750, 1000, 2500, 5000, 7500, 10000, 12500, 15000, 17500, 20000, 50000, 100000, or any number between (and including the particular endpoints thereof) any two of these numbers. The side arms are attached to the sulfonated lignin at the sulfonate groups. The larger the number of sulfonate groups on the lignin, the more side arms may be attached to it. One skilled in the art will appreciate that steric hindrance will play a role in the kinetics of the reactions by which the sulfonate groups may be substituted by the side arm containing compounds. A skilled artisan will, therefore, be able to choose an optimal level of sulfonation of lignin required to obtain a suitably substituted composition.

In some embodiments, the chloroformate group containing side arm 305 may be a chloroformate terminating poly(ethylene glycol). In some embodiments, the poly(ethylene glycol) 302 may have a chain length of about 2 to about 24. Examples of chain lengths include, but are not limited to, 2, 5, 7, 11, 13, 17, 22, 24, or any number between (and including the particular endpoints thereof) any two of these values. A skilled artisan will appreciate that shorter PEG chain length will provide less steric hindrance resulting in a higher coverage of the PEG 302 on the lignin core 301. It will be understood by a skilled artisan that in embodiments where the composition described herein is used for making adhesives, shorter PEG chain length will result a stronger adhesives because there will more chloroformate groups 305 available for covalent conjugation per lignin core 301. Similarly, it will be understood that longer PEG chain lengths result in lesser coverage on the lignin core 301, thereby reducing the strength of the adhesive. One skilled in the art will, therefore, be able to optimize the PEG chain length based on the desired application and the strength of resulting adhesive required. In some embodiments, each sulfonated lignin 301 may have multiple chloroformate group containing side arms 305 such as, for example, 1, 2, 5, 10, 15, 20, 25, 50, 75, 100, 250, 500, 750, 1000, 2500, 5000, 7500, 10000, 12500, 15000, 17500, 20000, 50000, 100000, or any number between (and including the particular endpoints thereof) any two of these numbers. In some embodiments, the ratio of number of chloroformate groups to the number of sulfonate groups may be, for example, 1:1, 1:2, 1:3, 1:4, 1:5, 1:6, 1:7, 1:8, 1:9, 1:10, 1:20, 1:30, 1:40, 1:50, or any ratio between (and including the particular endpoints thereof) any two of these ratios.

In some embodiments, the composition 310 may additionally include one or more preservatives. Various embodiments of preservatives that may be used in the composition 210 are described herein. A skilled artisan will appreciate that similar preservatives may be used in the composition 310 as those used in the composition 210. Likewise, it will be understood by one of skill in the art that the amount of preservative that may be required for the composition 310 will be similar to that of the composition 210. A skilled artisan will be readily able to optimize the amount of preservative required for the composition 310 in order to suitably obtain the properties desired for a particular application in a certain embodiment.

In some aspects, a method of making a composition with sulfonated lignin having at least one chloroformate group containing side arm is described. In some embodiments, the method may include contacting the sulfonated lignin with a compound having a terminal chloroformate group under conditions that allow for coupling of the sulfonated lignin 301 with the compound. FIG. 3 shows an exemplary chemical reaction for making a composition 310 according to one embodiment. In some embodiments, the sulfonated lignin 301 may be contacted with a suitable compound such as, for example, a poly(ethylene glycol) (PEG) 302 that does not terminate in a chloroformate group to form an intermediate lignosulfonate compound 303 which may be modified under suitable conditions to form a compound 310 with sulfonated lignin having at least one chloroformate group containing side arm 305. It is to be understood that given the nature of chemistry involved, contacting the sulfonated lignin with a chloroformate terminating compound or contacting the sulfonated lignin with another suitable compound to form an intermediate compound followed by modifying the intermediate compound to terminate in a chloroformate group are analogous steps for obtaining a sulfonated lignin having at least one chloroformate group containing side arm. Various embodiments, of the sulfonated lignin 301, the suitable compound 302, and the resulting composition 310 are described herein.

In some embodiments, the sulfonated lignin 301 is contacted with a heterobifunctional PEG having a chloroformate group and a hydroxyl group under Mitsunobu conditions to obtain the chloroformate terminating sulfonated lignin 310. Various embodiments for the Mitsunobu conditions and the reagents used therein are described herein. In some embodiments, the heterobifunctional PEG may have a chain length of about 2 to about 24. Examples of chain lengths include, but are not limited to, 2, 5, 7, 11, 13, 17, 22, 24, or any number between (and including the particular endpoints thereof) any two of these values. A skilled artisan will be able to optimize the Mitsunobu conditions for the specific choice of heterobifunctional PEG.

In some embodiments, the sulfonated lignin 301 and the suitable compound 302 are contacted under Mitsunobu conditions. Various embodiments for the Mitsunobu conditions and the reagents used therein are described herein. A skilled artisan will be able to optimize the Mitsunobu conditions required for making the intermediate compound 303.

In some embodiments, the intermediate compound 303 may be modified to terminate in a chloroformate group. In some embodiments, the intermediate compound 303 is contacted with phosgene to form the chloroformate terminating sulfonated lignin 310. In some embodiments, the intermediate compound 303 is contacted with carbon monoxide and sulfur, or carbonyl sulfide in presence of a suitable amidine such as, for example, 1,8-diazabicyclo[5.4.0]undec-7-ene (DBU) followed by contacting with sulfuryl chloride to form the chloroformate terminating sulfonated lignin 310. The temperature and pressure conditions, the time and the concentrations of various reagents required during the reactions for forming the intermediate compound 303 and the chloroformate terminating sulfonated lignin 310 will be determined by factors readily recognized by a skilled artisan. Examples of such factors include, but are not limited to, the degree of sulfonation of the sulfonated lignin, the chain length of the PEG 302, the concentration of the sulfonated lignin 301 and the concentration of the PEG 302, and so forth.

In some aspects, an adhesive system is described herein. The adhesive system may include a first component made from a first sulfonated lignin having at least one amine group containing side arm, and at least one hydroxyl group containing side arm; and a second component made from a second sulfonated lignin having at least one chloroformate group containing side arm. The first component and the second component are not mixed together.

In some embodiments, the ratio of number amine groups in the first component to number of chloroformate groups in the second component may be, for example, 1:0.1, 1:0.2, 1:0.3, 1:0.4, 1:0.5, 1:0.6, 1:0.7, 1:0.8, 1:0.9, 1:1, or any ratio between (and including the particular endpoints thereof) any two of these ratios.

In some embodiments, one or both of the first component and the second component may additionally contain one or more preservatives. The desired application of the adhesive system will determine the suitable preservative that may be used. Various embodiments of the preservative are described herein. The amount of preservative that may be added to the composition may vary depending on the desired application of the composition. In some embodiments, the amount of preservative may be (by weight), for example, 0.05%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, or any amount between (and including the particular endpoints thereof) any two of these amounts. One skilled in the art will be able to optimize the amount of preservative without compromising the desired chemical properties of the adhesive system.

In some embodiments, the first component and the second component may be disposed in two distinct containers. In some embodiments, the first component and the second component may be disposed in two separated portions of a container. In some embodiments, the first component may be disposed, for example, in a syringe, and the second component may be disposed, for example, in a distinct syringe. In some embodiments, the first component and the second component may be, for example disposed in a syringe having two separated compartments and having separate plungers for each compartment such that at least a portion of the two plungers that is not in the compartments is connected. In such an embodiment, the plungers will be depressed by equal amount when pressure is applied to the connected portion of the plungers.

In some embodiments, an adhesive is formed after mixing the first component and the second component. In some embodiments, the first component and the second component chemically react by forming a covalent bond between the hydroxyl group and the chloroformate group to via carbonate linkage, and evolving HCl gas. In some embodiments, the amine groups from the first component quench the evolved HCl gas to form quaternary amine salts. In some embodiments, the quaternary amine salts may have biocidal properties.

It will be understood that the adhesive strength provided by this adhesive system is dependent on the number and strength of the covalent bonds formed via the carbonate linkage described herein. Therefore, by varying the ratio of number of hydroxyl groups to the number of chloroformate groups, a skilled artisan may be able to modify the strength of the adhesive for a desired application. In applications where evolution of HCl gas is undesirable, it may be desirable to have the number of amine group containing side arm in the first component of the adhesive system to be at least equal to the number of chloroformate group containing side arms in the second component of the adhesive system. It will be appreciated by a skilled artisan that the ability of amine groups to quench the HCl gas may depend on the total number of amine groups, the spatial distribution of the amine groups as well as the presence of other groups on the amine containing side arm in the first component. Similarly the biocidal strength of the quaternary amine salts formed upon quenching of the evolved HCl gas will depend on the number and specifics of the amine containing side arm in the first component. As desirable for particular applications, a skilled artisan may choose particular amino alcohol or reduced amino acid 202 for a desired adhesive system.

In some aspects, methods of adhering two surfaces are described. In some embodiments, the first component and the second component of an adhesive system described herein may be mixed together, either or both the surfaces are contacted with the mixture of the first and the second component, and the two surfaces may be contacted thereafter. Examples of materials that may present surfaces to be adhered include, but are not limited to, paper, plastics, wood, cloth, skin, leather, metals, non-metals, rubbers, polymers, foams, laminates, ceramics, cements, and so forth. In some embodiments, both the surfaces may be on the same object. In some embodiments, both the surface may be on different objects such as when, for example, adhering two objects of the same material, or adhering two objects made of different materials.

In some embodiments, one of the two surfaces may be contacted with the first component, the other surface may be contacted with the second component, and the two surfaces may be contacted with each other thereafter. Various embodiments of surfaces that may be adhered together are described herein.

EXAMPLES

Example 1

Preparation of Lignosulfonate Adhesives

The first component of the adhesive system is produced by reacting sulfonated lignin with reduced lysine and poly(ethylene glycol) having chain length, $n_1=4$. The reaction is carried under Mitsunobu conditions with triphenyl phosphine and diethyl azodicarboxylate as Mitsunobu reagents. The concentrations of individual reactant compounds are adjusted such that the ratio (A:S) of number of amine groups to number of sulfonate groups is 1:2 and the ratio (H:S) of number of hydroxyl groups to number of sulfonate groups is about 1:4.

The second component of the adhesive system is produced by reacting sulfonated lignin with poly(ethylene glycol) having chain length, $n_2=6$. The reaction is carried under Mitsunobu conditions with triphenyl phosphine and diethyl azodicarboxylate as Mitsunobu reagents. The concentration of sulfonated lignin and poly(ethylene glycol) is adjusted such that the ratio of number of hydroxyl groups to number of sulfonate groups is about 1:4. The resulting compound, a lignosulfonate PEG, is then reacted with carbonyl sulfide in presence of diazabicyclo[5.4.0]undec-7-ene (DBU) in tetrahydrofuran (THF) at about 80° C. for about 6 hours under 10 atmosphere pressure. The reaction mixture is then cooled to room temperature, methyl iodide (MeI) is added and the reaction continued for about 16 hours at ambient pressure. Sulfuryl chloride is then slowly added to the resulting product at 0° C. and ambient pressure, temperature increased to room temperature and the reaction mixture stirred vigorously for about an hour to form the chloroformate terminating lignosulfonate PEG.

The first component is applied to a prepared surface of wood and the second component is applied to a prepared surface of a laminate. The wood and the laminate are then pressed together such that the surfaces with the first component and second component are facing each other. The two components react to form a covalent bond between the chloroformate group of the second component and the hydroxyl group of the first component via carbonate linkage. The evolved HCl gas is quenched by the amine groups present on the first component to form quaternary amine salts. So long as the ratio (A:C) of the number of amine groups in the first component to the number of chloroformate groups in the second component exceeds 1:1, no HCl gas escapes the joint.

Examples 2-6

Variations in Lignosulfonate Adhesives

Multiple compositions are achieved by varying the chain lengths $n_1$ and $n_2$, and the ratios A:S, H:S, and A:C as described herein. It is preferable that the ratio A:C exceeds 1:1 in order to quench all of the HCl liberated when the two components react. The following table provides some examples of the various compositions.

| Example | $n_1$ | $n_2$ | A:S | H:S | A:C |
|---|---|---|---|---|---|
| 2 | 5 | 8 | 1:2 | 1:5 | 1:1 |
| 3 | 7 | 4 | 1:3 | 1:4 | 1:1 |
| 4 | 8 | 6 | 1:2.5 | 1:6 | 1.25:1 |
| 5 | 10 | 5 | 1:4 | 1:2 | 2:1 |
| 6 | 8 | 8 | 1:3 | 1:3 | 1:1 |

Example 7

Packaging of Lignosulfonate Adhesives

A double bore syringe is used for packaging the two-component adhesive. The first component is filled into one of the bores of the syringe and the second component is filled into the other bore. The syringe has two plungers—one for each bore—that are connected at the portion that extends outside of the bores such that when the connected portion is depressed, both the plungers are pushed down by the same distance. When the connected portion of the plungers is depressed, the amount of the two components that is delivered is in ratio of the size of the two bores of the syringe. The ratio of size of the two bores can be adjusted based on the specific composition of the two components, and the H:C and A:C ratios. The two components can then be mixed to form the adhesive.

The two components can also be packaged in two separate syringes. In such packaging, the volume of each component dispensed from the respective syringe is controlled manually by knowing the specifics of the compositions of the two components.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or at least one and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of making a composition comprising a sulfonated lignin having a first side arm comprising an amine group, and a second side arm comprising a hydroxyl group, the method comprising: contacting the sulfonated lignin with a first compound having an amine group and a second compound having a hydroxyl group under Mitsunobu conditions that allow for coupling of the first compound and the second compound to the sulfonated lignin.

2. The method of claim 1, wherein the contacting step comprises contacting the sulfonated lignin with a reduced amino acid.

3. The method of claim 1, wherein the contacting step comprises contacting the sulfonated lignin with a reduced lysine.

4. The method of claim 1, wherein the contacting step comprises contacting the sulfonated lignin with a poly (ethylene glycol).

5. The method of claim 1, wherein the contacting step comprises using reused or recycled reagents for the Mitsunobu conditions.

6. The method of claim 1, wherein the contacting step comprises contacting the reduced amino acid and sulfonated lignin such that the ratio of number of amine groups to number of sulfonate groups is about 1:2 to about 1:1000.

7. The method of claim 4, wherein the contacting step comprises contacting a poly(ethylene glycol) that has a chain length of about 2 to about 24.

* * * * *